United States Patent [19]

Nøst

[11] Patent Number: 5,280,529
[45] Date of Patent: Jan. 18, 1994

[54] COMMUNICATION NETWORK INTENDED FOR SECURE TRANSMISSIONS

[75] Inventor: Jan P. Nøst, Trollåsen, Norway

[73] Assignee: Alcatel STK A/S, Oslo, Norway

[21] Appl. No.: 875,443

[22] Filed: Apr. 29, 1992

[30] Foreign Application Priority Data

Apr. 29, 1991 [NO] Norway .................................. 911679

[51] Int. Cl.⁵ ........................................... H04L 9/00
[52] U.S. Cl. .......................................... 380/49; 380/9;
380/50
[58] Field of Search .................... 380/9, 20, 21, 43, 49,
380/50; 379/93–95

[56] References Cited

U.S. PATENT DOCUMENTS 4,802,220  1/1989  Marker, Jr. ........................... 380/33
5,115,466  5/1992  Presttun ................................ 380/9

FOREIGN PATENT DOCUMENTS

0406187A1  1/1991  European Pat. Off. ........ H04L 9/00
0436799A2  7/1991  European Pat. Off. ........ H04L 9/08
61-278256  12/1986  Japan ............................. H04M 3/42

OTHER PUBLICATIONS

"Encryption and ISDN-A Natural Fit" by B. O'Higgins, et al, pp. 863–869, International Switching Symposium 1987, Innovations in Switching Technology, Phoenix, Ariz., Mar. 15–20, 1987.
"Security Measures in Communicaiton Networks", K. Presttun, Electrical Communication, vol. 60, No. 1, 1986, pp. 63–70.
"Information Protection in the Swedish ISDN", K. Erlandsson et al, Proceedings of the International Switching Symposium, May 27–Jun. 1, 1990, vol. III, pp. 53–57.

Primary Examiner—Bernarr E. Gregory
Attorney, Agent, or Firm—Ware, Fressola, Van Der Sluys & Adolphson

[57] ABSTRACT

A secure communications network having different types of subscriber terminals (1–4) and switching modules (7–8) connected to other switching modules in the network includes cryptographic devices (13–15) where at least one of the cryptographic devices is a cryptographic-pool device having a number of cryptographic modules (35) wherein the cryptographic-pool device is physically separated from the switching modules (7,8), and wherein at least one of the cryptographic-pool devices (13–18) is within a security guard (9 or 10) connected between a switching module (7 or 8) and the network. A security guard may include routing devices (32,31) or handling control signals that specify protection criteria. A managing device (30) may also be included within a security guard for deciding the manner for carrying a communication channel through the security guard and for setting out rules for governing security-guard decision-making. The managing device may be selectively controlled both on-line and off-line.

17 Claims, 2 Drawing Sheets

COMMUNICATION NETWORK INTENDED FOR SECURE TRANSMISSIONS

TECHNICAL FIELD

The present invention relates to a communication network intended for secure transmission of speech and data and, more particularly, to enciphering and deciphering of digital communication paths in data- and/or telecommunication networks.

BACKGROUND OF THE INVENTION

It relates in particular to a network including different types of subscriber terminals and switching modules, where subscriber lines connect each subscriber terminal with a switching module and transmission links connect each switching module to other switching modules in the network, and where the network further comprise cryptographic devices to undertake cryptographic transformation of the information transmitted through the network.

These paths are set up between network terminals which may be any kind of equipment, application, resource, manager, users etc., attached to the network in one way or another.

Data- and telecommunication networks are built up from communicating switching modules as, e.g., PABXs and PBXS. The switching modules manage communication paths through sets of communication channels. These communication channels are the physical information carriers. The information signal or the datastream carried by a channel is enciphered whenever security is required. Enciphered data on a channel requires that cryptographic devices which carry out the enciphering and deciphering process, be attached to the data stream connected to the channel.

Such cryptographic transformation of data- and telecommunication networks are earlier known when security is required, and different solutions have been proposed.

Among the most straight-forward solutions, a link-by-link cryptographic equipment should be mentioned first. Here each transmission link has a cryptographic device, including encryption and decryption devices at in each of its ends, which system only protects the transmission links themselves. As a second, rather straightforward solution, there should be mentioned an end-to-end cryptographic equipment where each subscriber involved has a cryptographic device that can be inserted into the traffic channel after the call has been set up. In the latter case also the switches of the network will be included in the cryptographic traffic.

These solutions give, however, rather expensive and poorly flexible solutions as the cryptographic devices have to be constantly assigned to the links or to the subscribers involved.

From Japanese Patent Application No 85-121742 filed on Jun. 4, 1985, inventor Yasuhiro Watanabe (Early-disclosure No.: 86-278256), there is known a solution where each PABX is provided with special cipher trunks for ciphering and deciphering. The terminal units are connected with the public network through office trunks in the case of ordinary communication and through cipher trunks in the case of ciphered communication.

According to the above-cited Watanabe specification ciphered communication can be executed between optional terminal units without installing a ciphering circuit and a deciphering circuit for every terminal unit. The Japanese PABX have a number of office trunks which can be used for secured as well as non-secured transmission. Secure messages are routed through one of a number of cipher trunks before transmitting the data through the public network. A central processing unit of the PABX controls connection of terminal units intended for ciphered communication to the public network through the cipher trunks. In this layout the enciphering/deciphering equipment is part of the PABX.

In a presentation made by Swedish Telecom at ISS'90 and the associated paper "Information Protection in the Swedish ISDN" there is a description of an encryption device which can be dynamically allocated to a B-channel for cryptographic transformation. Several such devices are arranged in a pool through which the attached switching module can route B-channels to be encrypted or decrypted. One encryption device can only operate on one B-channel at a time. This is controlled and managed by the switching module. The pool is integrated with the switching module in a way that it is directly controlled by the central processing unit of the switching module. No control is carried out in the pool itself which only is a way of gathering encryption devices in a common resource pool.

The encryption system described in the Swedish paper has the following limitations:

the pool of encryption devices is integrated and directly controlled by the attached switching module. This means that great impact on the switching module is necessary.

the pool is only used for encryption of public network subscriber lines and thus will have limited flexibility.

the pool cannot provide for end-to-end encryption of B-channels through the public network.

the supported subscriber lines are limited to the ISDN Basic Rate Access (2B+D) type of interface. The ISDN Primary Rate Access (30B+D) type of interface is not supported which makes the pool not able to support ISPABX subscriber attachments to the public network.

the pool is accessed by an internal interface and controlled through specific signalling procedures of the switching module and not through a standardized interface. This makes the pool dependent on the manufacturer and also directly dependent on the attached switching module.

DISCLOSURE OF THE INVENTION

From co-owned European Patent Application No. 90 121 567.3 of Kåre Presttun, published on 17 Jul. 1991 under No. 0 436 799 A 2, and hereby incorporated by reference, there is shown a solution which is physically independent of the attached switching module. According to the specification of this solution of K. Presttun, an information stream carried by a communication channel is encrypted/decrypted when the channel is routed through a cryptographic module (CM) of a cryptographic pool by the attached switching module or subscriber terminal terminating the information stream. The cryptographic pool communicates with the attached switching module through a standardized interface.

This means that either the subscriber terminal, the switching module or both must be equipped with a module capable of communicating with and using the services of the cryptographic pool. The cryptographic-pool is therefore dependent on being used by other modules in the communication network.

Standardized communication channels which are carriers of ISDN bearer services and handled by one CM in the cryptographic-pool can have, for the European example, the maximum transmission speed of 1920 kbit/s (H11-channel, 30 B-channels). Similar limitations apply in other countries. When the cryptographic-pool is attached to the switching module with one link carrying the encrypted information (cipher text) and another the decrypted information (clear text) at least two links with the transmission speed of 2 Mbit/s must be available and dedicated to the cryptographic-pool.

The main object of the present invention is to improve the communication network described in said European application of Kåre Presttun and to overcome some of the limitations observed with the previously known cryptographic-pool proposals.

According to the present invention, a communication network intended for secure transmission of speech and data including different types of subscriber terminals and switching modules, where subscriber lines connect each subscriber terminal with a switching module and transmission links connect each switching module to other switching modules in the network, where transmission links and subscriber lines each carry one or more communication channels, and where the network further comprises: cryptographic devices to undertake cryptographic transformations or other required protection mechanisms of information transmitted through the network, and where at least one of the cryptographic devices is constituted by a cryptographic-pool device having a number of cryptographic modules which is physically separated from the switching modules, and which may communicate with the switching modules through standardized interface and communication protocols which makes the device accessible from subscriber terminals, from switching modules or from other network equipment, wherein at least one of the cryptographic-pool devices is a security guard arranged at the interface between a switching module and one of its transmission links such that no impact on the switching module is required.

In further accord with the present invention, the security guard includes means stored and managed by a managing device for specifying the criteria for whether a communication channel should be subjected to cryptographic transformation or a data packet (message) on a virtual communication channel should be subjected to protection as required.

In still further accord with the present invention, the security guard includes means stored and managed by the managing device which during installation or a managing procedure are configured by a security manager for monitoring control information on the signalling channel to detect whether a particular communication channel is to be cryptographically transformed or a data packet (message) is to be protected as required.

According still further to the present invention, the security guard is arranged to operate without seizing any specific resources, services or features from the attached switching module or subscriber terminal attached to the switching module.

In accordance with the present invention, the security guard is arranged to handle both circuit and packet switched data where the signalling channel only can handle packet switched data and where circuit switched data are covered by standardized communication channels which are carriers of ISDN bearer services.

In further accord with the present invention, the specifying means stored and managed by the managing device setting out the rules (or Security Policy) which governs the security-guard decision-making, is installed and maintained through security management features which can be both on-line (from remote) or off-line (manual) arrangements.

In still further accord with the present invention, the security guard managing device is arranged to monitor the signalling channel (D-channel) of its attachment interfaces and match this information to the Security Policy in order to decide whether the corresponding communication channel is to be encrypted or decrypted or whether the communication channel should be carried transparently through the security guard.

The present invention, which will be called a 'security guard', achieves the objective of being totally independent of the attached switching module and the subscriber terminals attached to the switching module,—whenever required. The invention may be configured in a way which has no impact whatsoever on the switching module or the subscriber terminals. Improvements over known systems are that:

1. no extra transmission links provided by the switching module for the attachment of the security guard, is required.
2. the security guard is totally independent of using any resources, services or features of the attached switching module.

The security guard has built in rules for enforcing the security of all the communications passing through the unit. These rules are stated in what is called a Security Policy. The security guard monitors the signalling channel (D-channel) of its attachment interfaces and matches this information to the Security Policy in order to decide whether or not the corresponding communication channel is to be protected. The communication channel is carried transparently through the security guard if no protection is required.

The signalling channel (D-channel) can also be used for data communication purposes. One or more virtual communication channels can be carried by the D-channel. Such virtual channels will carry data packets (messages) which can be subject to protection by the security guard. The protection is carried out according to the require security services expressed in the Security Policy. Additional protection to cryptographic transformation will be various kinds of integrity protections.

The security-guard includes means for deciding whether or not a communication channel is to be subject to cryptographic transformation or a data packet (message) is to be protected as required.

Besides functioning as a cryptographic-pool similar to that described said European application of Presttun, the security guard can activate itself without the attached switching module (PABX or ISPABX), or the subscriber terminal or subscriber being aware of it. The rules (or Security Policy) which governs the security guard decision-making are installed and maintained through security management features which can be both on-line (from remote) or off-line (manual) arrangements carried out by a security manager.

The security guard uses no extra resources whatsoever of the attached switching module.

The security guard can operate on at least thirty 64 kbit/s communication channels (B-channels) at any one time.

Above mentioned and other features and objects of the present invention will clearly appear from the following detailed description of embodiments of the invention taken in conjunction with the drawings.

BEST MODE FOR CARRYING OUT THE INVENTION

Figure 1:
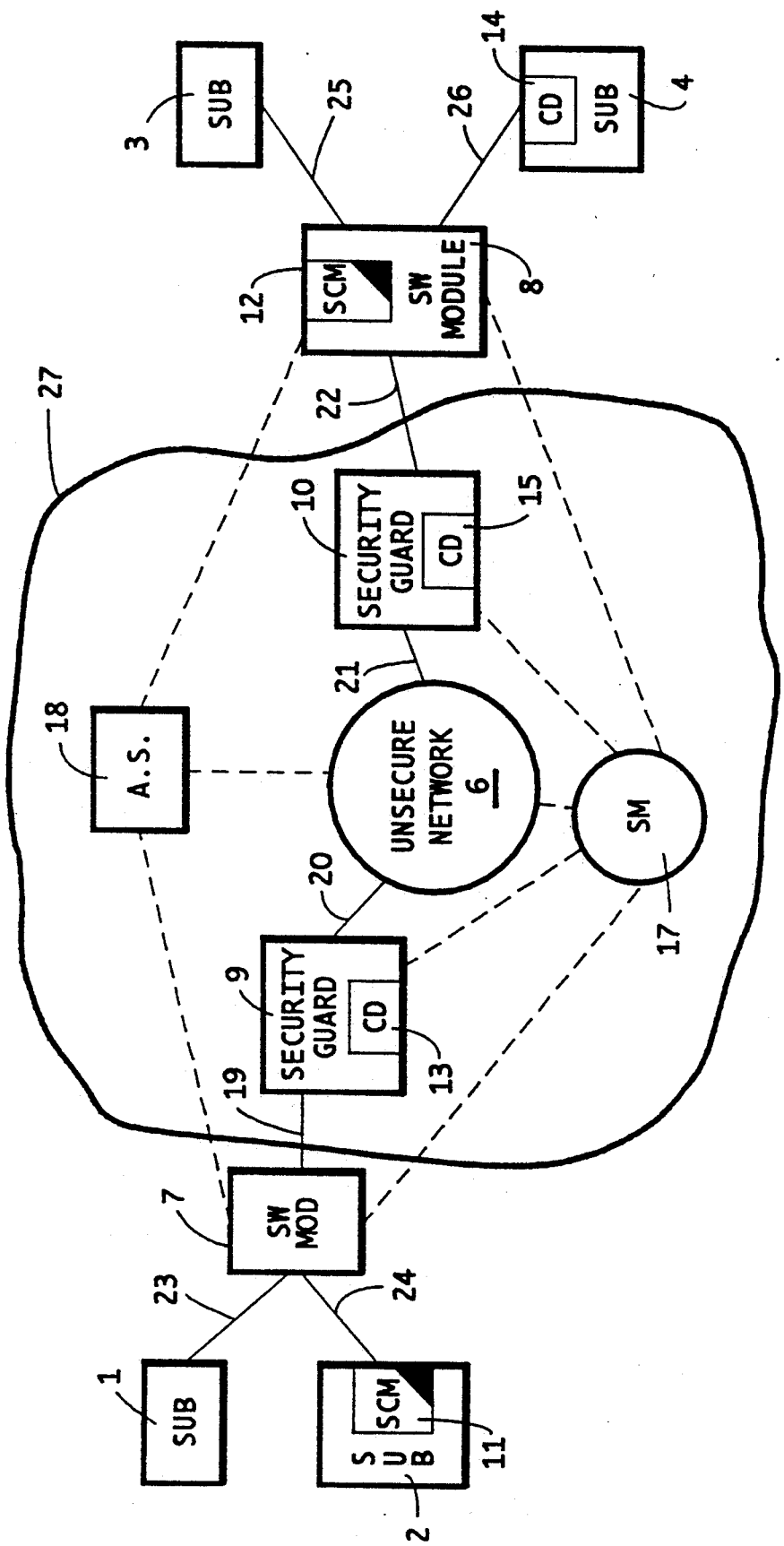
FIG. 1 schematically illustrates a communication network such as a secure ISDN network with security guard facilities.

FIG. 1 illustrates, as an example, how a number of subscriber terminals such as ISDN terminals 1,2,3 and 4 can be interconnected through a public unsecured ISDN network 6. The terminals 1-2 and 3-4 are respectively connected through switching modules such as ISDN PABX's 7 and 8 and through ISDN security guards 9 and 10, according to this invention, to the network 6. Security control modules 11,12 are respectively arranged in the terminal 2 and in the PABX 8. Cryptographic devices such as security modules 13,14,15 each including a security control module and at least one cryptographic module are respectively arranged in the terminal 4 and in the security guard 9 and 10. A security manager and his terminal equipment 17 is attached, as indicated with broken lines, either to the public network 6, to a security guard 9 (or 10) or a PABX 7 (or 8) through standardized interfaces. An authentication server 18 is connected to the PABX 7,8 and unsecure network 6.

The connections to and from the ISDN security guard units 9 and 10 are transmission links such as ISDN primary rate access links 19,20,21,22, whereas all other connections are ISDN basic access links, such as subscriber lines 23-26 interconnecting the subscriber terminals 1-4 with the PABX's 7 and 8. A secure ISDN network can, with the exception of the unsecured public network 6 be represented by the borderline 27. Secure communication through the public network 6 can be obtained by activating the relevant security control modules 11,12, the cryptographic modules (FIG. 2) and the security modules 13-15.

The security manager 17 operates, manages and maintains the security guard regarding security. In particular it manages and maintains the security rules (Security Policy) with which the security guard 9 (or 10) can operate on its own and take its own security decisions.

The authentication server 18 is attached either to the PABX 7 (or 8) or to the public network 6. It generates and stores certificates which are used by the security modules 13-16 in the process of user and equipment authentication (identity verification). It fulfills a similar role as the authentication server described in the above-cited EP 0 436 799 A2 publication.

Figure 2:
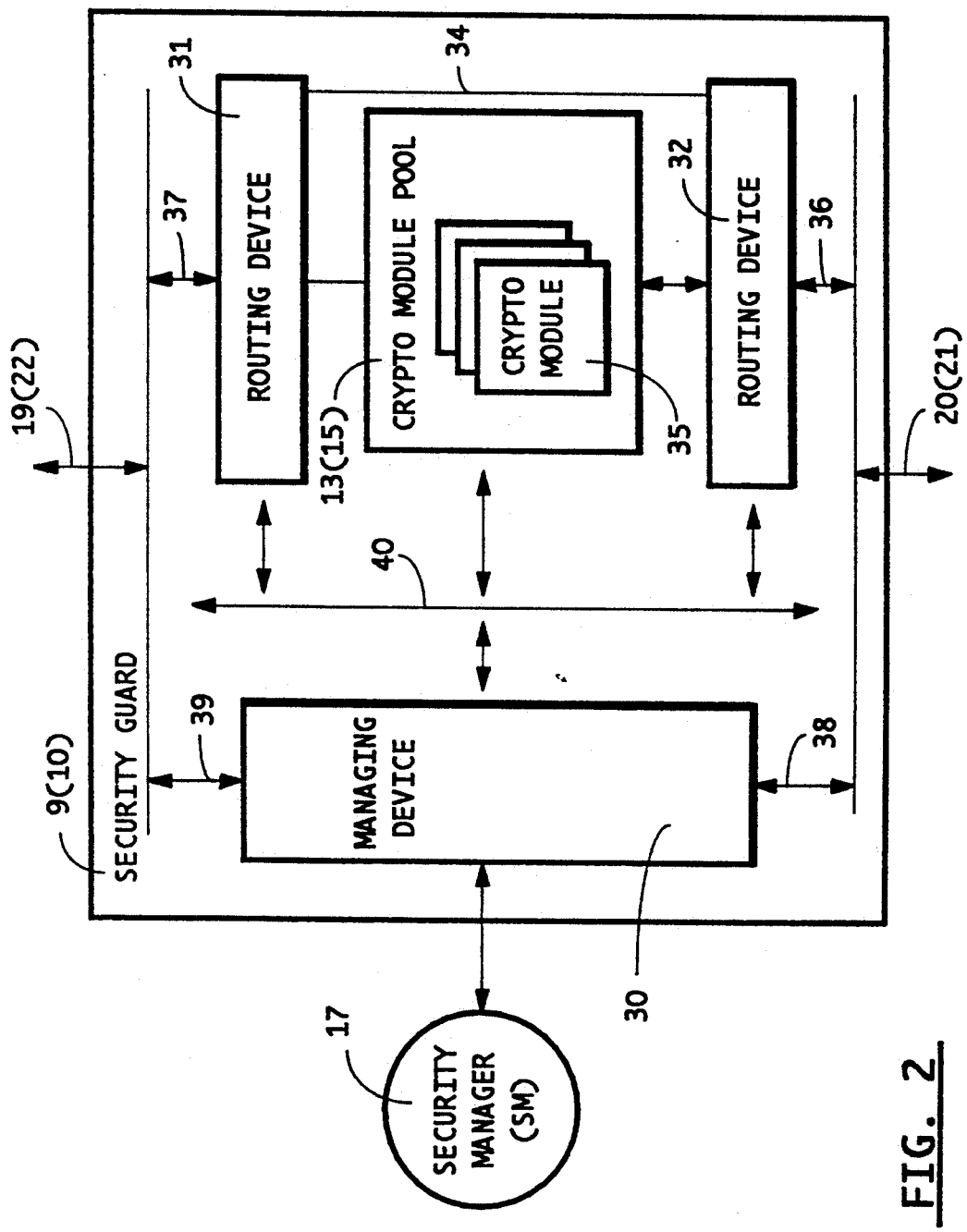
FIG. 2 illustrates the principles of a security guard unit.

In FIG. 2 is illustrated an ISDN security guard unit 9 (or 10) with primary rate access links 19 and 20 (or 22-21) and an access link to the security managing unit 17, through the network 6 (FIG. 1),—or directly by a specific physical and network independent attachment interface. The security manager 17 initializes and maintains a security guard managing device 30 in accordance with predetermined security protocols, and communication channels 36 (or 37) are routed through cryptographic module routing devices 31 and 32, so as either 1) to be passed through a cryptographic module pool 13 (15) to be subjected to cryptographic transformation, or 2) to bypass the cryptographic-pool through a bypass connection 34.

The cryptographic-pool 13 (15) contains a number of cryptographic modules 35 as described in said European application of K. Presttun.

The signalling channel (D-ch) 38 (or 39) is monitored in order to find out whether or not a communication channel is subjected to protection. When the security guard is used as a cryptographic-pool as described in said European application of K. Presttun, the signalling channel 38 (or 39) is used for control purposes carried out by a security control module 12.

Virtual communication channels which carry data packets (messages) are carried by the signalling channel (D-ch) 38 (or 39) and always routed to the security guard managing device 30 which again routes the data to to be subjected to cryptographic transformation, in the process of protecting a data packet, to a cryptographic module 35 through the internal databus 40.

The internal databus 40 is used by the security guard managing device 30 to control and setup the routing devices 31, 32 and the cryptographic modules 35 in the cryptographic-pool 13 (15). The security guard managing device (30) controls the total operation of the security guard and hence it is the central processing unit.

Examples will in the following be given for protecting communication paths through the unsecure network 6 and in particular involving the security guard units 9 and 10.

A communication path from subscriber 1 to subscriber 4 will pass unprotected and transparently through the PABX 7 to the security guard 9 in which the security module 13 is activated for encryption. An encrypted channel will then be set up through the unsecure network 6 transparently through the security guard 10 and the PABX 8 to the subscriber 4. The channel is decrypted by the security module 14 at the subscriber 4. In this case the Security Policy has specified that the security module 13 should be activated upon calls from subscriber 1 and that the security control module 12 in the PABX 8 should not set up the security module 15 in the security guard 10.

A communication path from the subscriber 3 to the subscriber 1 will pass unprotected over the line 25 and through the PABX 8 to the security guard 10 in which the security module 15 has been activated for encryption. An encrypted channel is set up through the unsecure network 6 to the security guard 9 in which the security module 13 has been activated for decryption. The communication path between the security guard 9 and the subscriber 1 is unsecure. In this case the Security Policy has specified that the security control module 12 in the PABX 8 should set up the security module 15 in the security guard 10.

If the subscriber 3 should communicate in a protected manner with the subscriber 2, the security control module 11 at the subscriber 2 must have set up the security module 13 in the security guard 9 in order to receive a protected communication channel.

The above detailed description of embodiments of this invention must be taken as examples only and should not be considered as limitations on the scope of protection.

I claim:

1. Apparatus for a communication network for secure transmission of speech and data, including different types of subscriber terminals (1-4) and switching modules (7-8), where subscriber lines (23-26) connect each subscriber terminal with a switching module and transmission links (19-22) connect switching modules to other switching modules in the network, where transmission links and subscriber lines each carry one or more communication channels, and where the apparatus comprises: cryptographic devices (13-15) to undertake cryptographic transformations of information transmitted through the network, and where at least one of the cryptographic devices is constituted by a cryptographic-pool device having a number of cryptographic modules (35) wherein the cryptographic-pool device is physically separated from the switching modules (7, 8), and wherein the cryptographic-pool device communicates with the switching modules by means of interface signals wherein the cryptographic-pool device is responsive to at least one of a plurality of devices including subscriber terminals, switching modules and selected network equipment, wherein at least one of the cryptographic-pool devices (13-15) is within a security guard (9 or 10) connected between a switching module (7 or 8) and the network.

2. Apparatus according to claim 1, wherein the security guard (9 or 10) includes a managing device (30) for specifying criteria for a communication channel subjected to cryptographic transformation and for a data packet on a virtual communication channel subjected to protection.

3. Apparatus according to claim 2, wherein the managing device (30), configured by a securing manager (17) for monitoring control information on a signalling channel (38 or 39) for determining that a particular communication channel is to be cryptographically transformed and to determine that a data packet is to be protected.

4. Apparatus according to claim 3, wherein the managing device (30) is arranged to monitor the signalling channel and match information in the signalling channel to the criteria in order to decide between alternatives of cryptographic transformations and protection mechanisms of the particular communication channel, decrypting the particular communication channel and allowing the particular communication channel through the security guard without any cryptographic transformation.

5. Apparatus according to claim 2, wherein the managing device (30) is for setting out rules for governing security-guard decision-making, and is for being controlled both on-line and off-line.

6. Apparatus according to claim 1, wherein the security guard (9 or 10) is for operating independently of an attached switching module and a subscriber terminal attached to the switching module.

7. Apparatus according to claim 1, wherein the security guard (9 or 10) is for handling both circuit and packet switched data where a signalling channel (38 or 39) is for handling packet switched data and for handling circuit switched data.

8. Apparatus for a communication network for protected transmission of speech and data, including subscriber terminals (1-4) and switching modules (7-8), where subscriber lines (23-26) connect each subscriber terminal with a switching module and transmission links (19-22) connect switching modules to other switching modules in the network where transmission links and subscriber lines are arranged to carry one or more communication channels, where the apparatus comprises: cryptographic devices (13-15) to undertake cryptographic transformations of information transmitted through the network, and where at least one of the cryptographic devices includes a cryptographic-pool device having a number of cryptographic modules (35) wherein the cryptographic-pool device is physically separated from the switching modules (7, 8), and wherein the cryptographic-pool device communicates with the switching modules by means of interface signals wherein the cryptographic-pool device is responsive to subscriber terminals, from switching modules and from selected network equipment, wherein at least one of the cryptographic-pool devices (13-15) is within a security guard (9, 10) wherein the security guard (9, 10) is a stand-alone like device arranged in at least one of the transmission links (19/20, 22/21) of the switching modules (7, 8) and comprises a managing device (30) for monitoring signalling information on one of a plurality of signalling channels (38, 39) for detecting a communication channel that has been selected for cryptographic transformation, and a data packet that has been selected for protection, and for signalling the selected protection by sending control signals to routing devices (32, 31) and cryptographic modules (35) of a security guard, and for specifying the protection criteria, for selectively transmitting protected information between any two terminals.

9. Apparatus according to claim 8, wherein the apparatus further comprises a security manager (17) for supplying the managing device (30) with criteria for choosing a selected type of protection, and communicate these criteria over the communication network (6).

10. The apparatus of claim 9, wherein said security manager (17) communicates the criteria for choosing a selected type of protection directly to the managing device (30).

11. Apparatus according to claim 8, wherein the security guard (9, 10) operates without seizing any specific resource from any device attached to the switching module.

12. Apparatus according to claim 8, wherein the security guard (9, 10) is responsive to both circuit and packet switched data where the signalling channel (38, 39) communicates signalling information and packet switched data.

13. Apparatus according to claim 8, wherein the managing device (30) is responsive to the signalling channel (38, 39) for deciding the manner for carrying the communication channel through the security guard.

14. Apparatus according to claim 8, wherein the managing device (30) is selectively controlled both on-line and off-line.

15. Apparatus for a communication network for secure transmission of speech and data, including different types of subscriber terminals (1-4) and switching modules (7-8), where subscriber lines (23-26) connect each subscriber terminal with a switching module and transmission links (19-22) connect switching modules to other switching modules in the network, where transmission links and subscriber lines each carry one or more communication channels, and where the apparatus comprises: cryptographic devices (13-15) to undertake cryptographic transformations of information transmitted through the network, and where at least one of the cryptographic devices is constituted by a cryptographic-pool device having a number of cryptographic modules (35) wherein the cryptographic-pool device is physically separated from the switching modules (7, 8), and wherein the cryptographic-pool device communicates with the switching modules by means of interface signals wherein the cryptographic-pool device is responsive to at least one of a plurality of devices including subscriber terminals, switching modules and selected network equipment, wherein at least one of the cryptographic-pool devices (13-15) is within a security guard (9 or 10) connected between a switching module (7 or 8) and the network wherein the security guard (9 or 10) includes a managing device (30) for specifying criteria for a communication channel subjected to cryptographic transformation and for a data packet on a virtual communication channel subjected to protection, wherein the managing device (30) is for setting out rules for governing security-guard decision-making, and is for being maintained both on-line and off-line.

16. The apparatus of claim 15, wherein the managing device (30) is arranged to monitor the signalling channel and match information in the signalling channel to the criteria in order to decide between alternatives of cryptographic transformations and protection mechanisms of the particular communication channel, decrypting the particular communication channel and allowing the particular communication channel through the security guard without any cryptographic transformation.

17. Apparatus for a communication network for protected transmission of speech and data, including subscriber terminals (1-4) and switching modules (7-8), where subscriber lines (23-26) connect each subscriber terminal with a switching module and transmission links (19-22) connect switching modules to other switching modules in the network, where transmission links and subscriber lines are arranged to carry one or more communication channels, where the apparatus comprises: cryptographic devices (13-15) to undertake cryptographic transformations of information transmitted through the network, and where at least one of the cryptographic devices (13-15) includes a cryptographic-pool device (13-15) having a number of cryptographic modules (35) wherein the cryptographic-pool device is physically separated from the switching modules (7, 8), and wherein the cryptographic-pool device communicates with the switching modules by means of interface signals wherein the cryptographic-pool device is responsive to at least one of a plurality of devices including subscriber terminals, switching modules and selected network equipment, wherein at least one of the cryptographic-pool devices is within a security guard (9, 10) wherein the security guard (9, 10) is a stand-alone like device arranged in at least one of the transmission links (19/20, 22/21) of the switching modules (7, 8) and comprises a managing device (30) for monitoring signalling information on one of a plurality of signalling channels (38, 39) for detecting a communication channel selected for cryptographic transformation, and a data packet selected for protection, and for signalling the selected protection by sending control signals to routing devices (32, 31) and cryptographic modules (35) of a security guard, and for specifying the protection criteria, for selectively transmitting protected information between any two terminals, wherein the managing device (30) is selectively controlled both on-line and off-line.

* * * * *